United States Patent
Bobbitt, III

(10) Patent No.: US 9,626,608 B2
(45) Date of Patent: Apr. 18, 2017

(54) ADDITIVE MANUFACTURED SERIALIZATION

(71) Applicant: Savannah River Nuclear Solutions, LLC, Aiken, SC (US)

(72) Inventor: John T. Bobbitt, III, Evans, GA (US)

(73) Assignee: Savannah River Nuclear Solutions, LLC., Aiken, SC (US)

( * ) Notice: Subject to any disclaimer, the term of this patent is extended or adjusted under 35 U.S.C. 154(b) by 0 days.

(21) Appl. No.: 14/955,222

(22) Filed: Dec. 1, 2015

(65) Prior Publication Data

US 2016/0283834 A1    Sep. 29, 2016

Related U.S. Application Data

(60) Provisional application No. 62/085,877, filed on Dec. 1, 2014.

(51) Int. Cl.
| | | |
|---|---|---|
| G06K 7/10 | (2006.01) | |
| G06K 19/06 | (2006.01) | |
| B41M 3/14 | (2006.01) | |
| B29C 67/00 | (2017.01) | |
| B33Y 10/00 | (2015.01) | |
| B33Y 80/00 | (2015.01) | |

(52) U.S. Cl.
CPC .... *G06K 19/06037* (2013.01); *B29C 67/0055* (2013.01); *B29C 67/0077* (2013.01); *B29C 67/0081* (2013.01); *B41M 3/14* (2013.01); *G06K 7/10722* (2013.01); *B33Y 10/00* (2014.12); *B33Y 80/00* (2014.12)

(58) Field of Classification Search
USPC ........................................................ 235/454
See application file for complete search history.

(56) References Cited

U.S. PATENT DOCUMENTS

| | | |
|---|---|---|
| 3,718,066 A | 2/1973 | Dally |
| 3,826,754 A | 7/1974 | Grossman |
| 3,854,372 A | 12/1974 | Gutshall |
| 3,890,876 A | 6/1975 | Dahl |
| 4,209,335 A | 6/1980 | Katayama et al. |
| 4,428,240 A | 1/1984 | Schoeps |

(Continued)

FOREIGN PATENT DOCUMENTS

| | | |
|---|---|---|
| WO | WO 94/06006 | 3/1994 |
| WO | WO 99/65699 A1 | 12/1999 |

OTHER PUBLICATIONS

Internal ID Tagging for 3D Productables—3D Printing Industry; website: http://3dprintingindustry.com/2013/072/25/internal-id-tagging-for-3d-productables/ 6 pages.

(Continued)

*Primary Examiner* — Ahshik Kim
(74) *Attorney, Agent, or Firm* — Dority & Manning, P.A.

(57) ABSTRACT

Methods for forming an identifying mark in a structure are described. The method is used in conjunction with an additive manufacturing method and includes the alteration of a process parameter during the manufacturing process. The method can form in a unique identifying mark within or on the surface of a structure that is virtually impossible to be replicated. Methods can provide a high level of confidence that the identifying mark will remain unaltered on the formed structure.

21 Claims, 3 Drawing Sheets

(56) References Cited

U.S. PATENT DOCUMENTS

| | | | |
|---|---|---|---|
| 4,446,979 | A | 5/1984 | Gach et al. |
| 5,387,740 | A | 2/1995 | Sasae et al. |
| 5,678,234 | A | 10/1997 | Colombo et al. |
| 5,833,922 | A | 11/1998 | Held et al. |
| 5,970,798 | A | 10/1999 | Gleman et al. |
| 6,320,091 | B1 | 11/2001 | Ebbinghaus et al. |
| 6,363,606 | B1 | 4/2002 | Johnson, Jr. et al. |
| 6,402,447 | B1 | 6/2002 | Babak |
| 6,620,092 | B2 | 9/2003 | Albus et al. |
| 6,644,763 | B1 | 11/2003 | Gothait |
| 6,838,504 | B1 | 1/2005 | Webster et al. |
| 7,024,938 | B2 | 4/2006 | Gleman et al. |
| 7,091,393 | B2 | 8/2006 | Chekhmir et al. |
| 7,150,594 | B2 | 12/2006 | Keener |
| 7,335,902 | B2 | 2/2008 | Soundararajan |
| 7,585,270 | B2 | 9/2009 | Doumbos et al. |
| 7,645,095 | B2 | 1/2010 | Tang et al. |
| 7,660,704 | B2 | 2/2010 | Shiga |
| 7,983,792 | B2 | 7/2011 | Gombert et al. |
| 8,579,620 | B2 | 11/2013 | Wu |
| 8,742,195 | B2 | 6/2014 | Wagh et al. |
| 2004/0225474 | A1 | 11/2004 | Goldfine et al. |
| 2006/0062650 | A1 | 3/2006 | Keener |
| 2008/0119684 | A1 | 5/2008 | Mason et al. |
| 2009/0091144 | A1 | 4/2009 | Debrody et al. |
| 2009/0268861 | A1 | 10/2009 | Shayer |
| 2010/0053287 | A1 | 3/2010 | Belelie et al. |
| 2010/0055415 | A1 | 3/2010 | Belelie et al. |
| 2010/0217270 | A1 | 8/2010 | Polinski et al. |
| 2011/0250410 | A1 | 10/2011 | Rygas et al. |
| 2012/0071703 | A1 | 3/2012 | Martin et al. |
| 2012/0116203 | A1 | 5/2012 | Vancraen et al. |
| 2013/0014368 | A1 | 1/2013 | Woods et al. |
| 2013/0168451 | A1* | 7/2013 | Decoux ............ G06K 19/06037 235/454 |
| 2013/0294579 | A1 | 11/2013 | Nance et al. |
| 2014/0058959 | A1 | 2/2014 | Isbjornssund et al. |
| 2014/0073830 | A1 | 3/2014 | Gan et al. |
| 2015/0223768 | A1* | 8/2015 | Kieser ................ A61B 17/7004 235/375 |
| 2016/0190069 | A1* | 6/2016 | Kondo .................. H01L 23/544 428/141 |
| 2016/0214323 | A1* | 7/2016 | Mizes ................. B29C 67/0088 |

OTHER PUBLICATIONS

Enterprise Labeling, "Why serialization will be more important than ever in a 3D-printed world," website: http://enterpriselabeling.com/why-serialization-will-be-more-important-than-ever-in-a . . . Feb. 5, 2014, 3 pages.

Savannah River Nuclear Solutions, LLC; International Patent Application PCT/US2015/040550; International Search Report; Oct. 8, 2015; 1 page.

Macfarlane; "Immobilization of Excess Weapon Plutonium: A better Alternative to Glass," Science & Global Security, (1998) vol. 7, pp. 271-309.

Epoche & Espri; "Physical protection: Anti-tamper mechanisms in CC security evaluations," Presentation; Oct. 30, 2013; (27 pages) [Retrieved from: http://www.yourcreativesolutions.nl/ICCC10/proceedings/doc/pp/ALVARO_ORTEGA_EPOCHE&ESPR1_Physical_Anti_tamper_mechanisms.pdf].

Savannah River Nuclear Solutions, LLC; International Patent Application PCT/US2015/63140; International Search Report; Apr. 8, 2016; 3 pages.

* cited by examiner

ADDITIVE MANUFACTURED SERIALIZATION

CROSS REFERENCE TO RELATED APPLICATION

This application claims filing benefit of U.S. Provisional Patent Application Ser. No. 62/085,877, Confirmation No. 4899, having a filing date of Dec. 1, 2014, which is incorporated herein by reference in its entirety.

STATEMENT AS TO RIGHTS TO INVENTIONS MADE UNDER FEDERALLY SPONSORED RESEARCH

This invention was made with Government support under Contract No. DE-AC09-08SR22470 awarded by the United States Department of Energy. The Government has certain rights in the invention.

BACKGROUND

There are many reasons that manufactured parts receive a unique identifier such as a serial number. Two of the most common reasons are to enable traceability of a part throughout its lifecycle and to insure the part is not a counterfeit. Traceability is normally accomplished by marking the part with a unique identifying code, or fingerprint. This can be accomplished by printing, for instance a label on a computer or the serial number on currency, or by stamping the code into a metal or plastic piece, for instance a vehicle identification number (VIN) or a firearm serial number. Unfortunately, such methods are subject to counterfeiting techniques. Labels are easily removed, and can be copied even if they contain advanced features such as holograms or embedded fibers. Stamped codes can also be removed or replicated. Techniques have been developed to try and recover a serial number after a criminal has filed the number off of a firearm, but this is an expensive process and not always successful.

Attempts have been made to include a unique identifier within the interior of a part so as to make removal, alteration, or replication of the identifier more difficult. For instance, with the advent of additive manufacturing, attempts have been made to include the serial number or other identifying mark within the bulk of a manufactured part.

Additive manufacturing refers to any method for forming a three-dimensional object in which materials are deposited according to a controlled deposition and/or solidification process. The main differences between additive manufacturing processes are the types of materials to be deposited and the way the materials are deposited and solidified. Some methods extrude materials including liquids (e.g., melts or gels) and extrudable solids (e.g., clays or ceramics) to produce a layer, followed by spontaneous or controlled curing of the extrudate in the desired pattern. Other processes deposit solids in the form of powders or thin films, followed by the application of energy and/or binders often in a focused pattern to join the deposited solids and form a single, solid structure having the desired shape. In some methods, successive layers are individually treated to solidify the deposited material prior to deposition of the succeeding layer, with each successive layer becoming adhered to the previous layer during the solidification process. Welding and casting can also be considered additive manufacturing methods. For instance areas of a casting mold can be locally cooled or heated, which can result in controlled and localized areas of the product having different porosity, density, etc.

Methods for uniquely marking objects formed according to an additive manufacturing process have been disclosed. Such methods include, for example, the addition of an identification tag within a layer or between layers; the formation of a pattern within one or more layers, such as the deposition of the material in a pattern of ones and zeros or other symbols in a recognizable fashion; or the deposition of a secondary material within a layer, optionally according to a predetermined distribution pattern. While such methods can produce an identifiable mark within a structure that can often be examined according to known non-destructive examination techniques, the identifiable marks are still subject to counterfeiting, which is becoming easier with the decrease in cost of additive manufacturing devices and processes.

What are needed in the art are methods for formation of a unique identifiable mark that is not subject to counterfeiting within or on a structure formed according to an additive manufacturing process. The manufactured parts thus formed can be uniquely recognized and identified for secure tracing and counterfeiting prevention.

SUMMARY

Aspects and advantages of the invention will be set forth in part in the following description, or may be obvious from the description, or may be learned through practice of the invention.

In one embodiment disclosed herein is an additively manufactured structure that includes a first area and a second area. The first and second areas include the same material, but differ according to density. More specifically, the second area includes the material in a distinct and random pattern. The distinct and random pattern of the material in the second area provides for the difference in density between the first area and the second area and provides a unique identifying mark to the structure.

Also disclosed is a method for forming an identification mark in a structure. For instance, a method can include depositing a formation material and cohering at least a portion of the formation material to form a portion of the structure. The method also includes altering a process parameter during a portion of the depositing and/or the cohering such that a first area of the structure has a first density and a second area of the structure has a second density. The first area comprises the identification mark and includes the formation material in a random and distinct pattern that is formed as a result of the alteration of the process parameter.

A method for identifying a structure is also disclosed. For instance, a method can include examining a pre-determined first area of the structure. The first area includes a formation material in a distinct and random pattern. The method also includes comparing the distinct and random pattern to a reference pattern. In addition, the method includes determining that the reference pattern and the distinct and random pattern are either the same or different so as to identify the structure as either the same structure as that of the reference pattern or as a different structure.

In one embodiment, the step of examining the predetermined area of the structure can include creating an image of the area. For example, the image can be an x-ray image, a computerized tomography (CT) scan or the like. The method can also include developing a data set of voxols from the image, with each voxol representing the density of the material in a region of the first area. The step of comparing the pattern of this first area with a reference pattern can thus include comparing the voxol data set with a reference voxol data set so as to identify the structure as either that structure from which the reference image was formed or as a different (e.g., counterfeit) structure.

These and other features, aspects and advantages of the present disclosure will become better understood with reference to the following description and appended claims.

BRIEF DESCRIPTION OF THE FIGURES

A full and enabling disclosure of the present invention, including the best mode thereof, directed to one of ordinary skill in the art, is set forth in the specification, which makes reference to the appended figures, in which.

DETAILED DESCRIPTION

Figure 1:
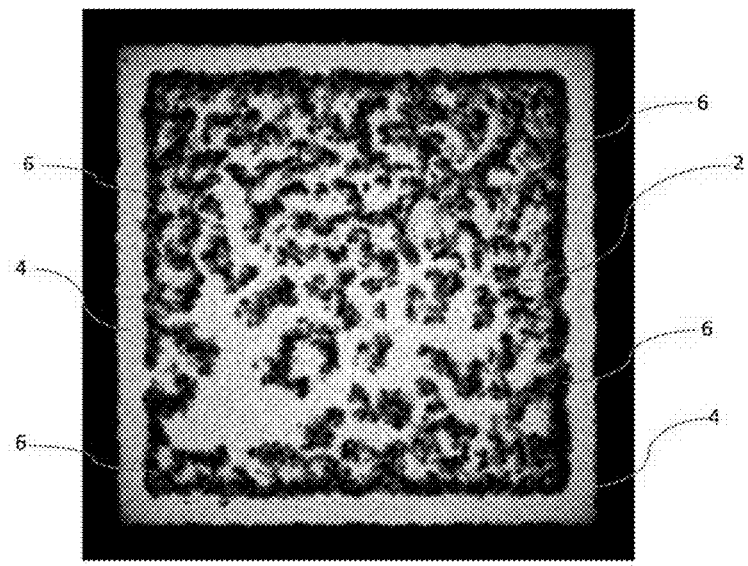
FIG. 1 presents an image of an identifying mark formed as disclosed herein showing the density of the local area as a minimum projection.

It is to be understood by one of ordinary skill in the art that the present discussion is a description of exemplary embodiments only, and is not intended as limiting the broader aspects of the present disclosure. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is generally directed to methods for forming an identifying mark in a structure; the structure being formed according to an additive manufacturing process. As utilized herein, the term additive manufacturing refers to a formation method in which materials are formed according to a controlled, incremental deposition and/or solidification process. For instance, additive manufacturing can refer to 3D printing by use of e.g., extrusion deposition or powder deposition optionally in combination with chemical binding, thermal binding, photopolymerization, etc.; lamination, stereolithography, casting, welding, and so forth.

The method can result in a unique identifying mark that is virtually impossible to be replicated and can be located in one embodiment in an internal area of the structure such that it cannot be removed without destroying the structure. Disclosed methods can provide a high level of confidence that the identifying mark will remain unaltered on the part.

This technique is particularly applicable to additively manufactured parts, also known as 3D printed parts. In general, any additive manufacturing process can be utilized in conjunction with disclosed processes and in formation of any manufactured part. Additive manufacturing processes encompassed can include, without limitation, selective laser sintering (SLS), direct metal laser sintering (DMLS), fused deposition modeling (FDM), selective laser melting (SLM), stereolithography (SLA), laminated object manufacturing (LOM), electron beam melting (EBM), Laser Engineered Net Shaping™ (LENS®), laser cladding, casting, welding, and 3D printing (3DP).

Additive manufacturing processes can differ from one another with regard to the composition and phase of the materials used to form individual layers as well as with regard to the method utilized to deposit and/or solidify the layer/structure. For instance, disclosed methods can be utilized with additive manufacturing processes that deposit the formation materials as a liquid as well as with additive manufacturing processes that deposit the formation materials in a solid phase.

In one embodiment, an additive manufacturing process can be used in which the formation material is extruded to form the successive layers of the final structure. For instance, a liquid phase material can be deposited in the form of a gel or suitably high viscosity liquid that can be extruded in the desired pattern. For example, a polymer melt or solution can be deposited via extrusion in a desired pattern and the extrudate can then be cured through, e.g., a change in temperature (e.g., spontaneously upon deposition) or via crosslinking (e.g., a UV or otherwise actively initiated curing mechanism). Following, another layer or area of the extrudate can be applied, followed by cure, and so on to build the entire three dimensional structure. Alternatively, successive areas (e.g., layers) of the extrudate can be built up and the entire structure can be cured in a single process. For instance, successive area of a clay or ceramic extrudate can be deposited to form a green structure, and the entire structure can be cured or sintered in a single step.

Materials that can be deposited via extrusion can include, without limitation, thermoplastics (e.g., polyolefins, polystyrenes, polyvinyl chloride, elastomeric thermoplastics, polycarbonates, polyamides, etc.), eutectic metal alloy melts, clays, ceramics, silicone rubbers, and so forth. Extrusion techniques are often utilized with fused deposition modeling, in which the extrudate is deposited from a nozzle that can be moved in both the horizontal and vertical directions according to the control system. The desired structure can be manufactured by extruding successive beads or filaments of the extrudate to form the final product.

The formation material can alternatively be deposited in the form of a powder to form a single area (e.g., a layer), and select areas of the powder layer can then be cohered according to the desired pattern to solidify the powder in the desired pattern and form a single layer of the structure. Following, another area of the powder can be deposited, the solidification process can be repeated, and the entire object can be produced. Powder deposition techniques can be beneficial in some embodiments as the excess powder that is not solidified can surround and support the structure during formation. This support can provide for the formation of more complicated structures.

Powders of metals, metal alloys, polymeric materials, ceramics, etc. can be used in an additive manufacturing process in which the unique identifying mark is formed in the final structure. For instance, a powder of the desired formation material can be deposited in a layer generally on the order of about 1000 micrometers (μm) in thickness or less, about 500 μm in thickness or less, or about 100 μm in thickness or less. The powder grain size is not particularly limited, and can be, e.g., about 500 μm or less in average size, about 200 μm or less in average size, about 100 μm or less in average size, or about 50 μm in less in average size in some embodiments.

In other embodiments, such as stereolithography, the formation material can be a liquid, for instance a liquid held in a liquid bath, and the material can be solidified through exposure to a curing force, e.g., ultraviolet light, one area at a time according to a predetermined pattern. For instance, a formation stage can be submerged in the liquid formation material, and a pattern can be traced in the liquid by a suitable energy source to solidify a first area of the formation material. As the stage is lowered in the bath, subsequent areas of the formation material can be solidified to build the final form.

Once an individual area has been formed, deposited, or otherwise patterned, either through extrusion, powder deposition, or some other process, the solidification of the formation material in specific areas and adherence between individual areas can be carried out in any fashion. For instance, deposited materials may cohere spontaneously upon deposition, for instance in the case of a fused deposition method utilizing an extrusion deposition process (e.g., a polymeric melt). Alternatively, cohesion of the deposited material can be actively instigated or encouraged following deposition. For example, a binder material can be deposited on a layer of the formation material according to the desired pattern and can bind the formation material to a cohesive solid. For example, an inkjet printer can be used to deposit a binder on a previously formed layer. The binder can be, e.g., water, an acrylate binder, an epoxy, etc. as is known in the art and can include a dye or other additive as is known.

Selective cohering of the formation materials can be carried out by methods as are generally known such as through variation in local environmental conditions (e.g., temperature, pressure, etc.), through the focused addition of energy (e.g., laser or UV curing, melting, or sintering), and so forth. For example, selective laser sintering can be utilized with metals, metal alloys, or polymers (or a combination thereof). Direct metal laser sintering is another suitable cohering technology in which a laser is used to fuse the powder grains of the deposited layer in the predetermined areas. The laser used in a laser sintering process can be any suitable laser such as a carbon dioxide laser and can be utilized in conjunction with a single component material or a multi-component material, as desired. For instance, a coated powder or a powder mixture can be cohered according to a laser sintering process. Selective laser melting is a similar process, but in this method the powder grains are fully melted rather than sintered. Thus, the final property characteristics such as crystal structure, density, porosity, etc. can differ depending upon the method used to solidify the powders, even when the materials are chemically identical.

Electron beam energy can also be utilized to solidify a formation material following deposition. Electron beam manufacturing fully melts a powder, e.g., a metal or metal alloy powder, following deposition and is generally utilized in forming a fully-dense structure with high strength characteristics.

A lamination additive manufacturing process can be utilized, in which paper, metal, metal alloy, and/or polymeric films are the build material. According to this method, an adhesive binder can be applied to adhere the individual films to one another and form a solidified structure. The laminate structure can be cut to a desired shape following adhesion of the multiple films or alternatively the individual films can be shaped prior to adhesion, as desired.

Other additive manufacturing processes such as photopolymerization processes (e.g., steriolithography, contact lithography, etc.), casting, welding, etc. can also be utilized in conjunction with the marking processes described herein.

Irrespective of the particular method utilized in the additive manufacturing process, the method can generally have optimum processing parameters to produce the desired structure. These parameters can vary depending upon the specific build technique, the formation material(s), the geometry of the structure being formed, the final characteristics desired for the structure being formed, etc. Processing parameters can include both the parameters of the deposition as well as the parameters of the coherence. By way of example, processing parameters can include the rate of deposition of the formation material, the rate of deposition of any binding material, the temperature of the formation material and/or binding material during or following deposition, the characteristics of the binding energy (e.g., the power of focused energy), the deposition and/or cohesion conditions (e.g., temperature, pressure, humidity, etc.), the rate of cohering the formation material, and so forth.

Consistent material properties can be assured throughout a structure formed according to an additive manufacturing process by maintaining the processing parameter consistently throughout the process.

To develop a unique identification mark in/on an additively manufactured structure according to the disclose methods, one or more of the processing parameters can be temporarily altered during the formation process. Through temporary alteration of one or more processing parameters, the final structure can include an area with material properties that differ in one or more respects as compared to other areas of the structure. For instance, the density of a local area can vary upon alteration of one or more processing parameters during the formation of that area. This local area of varied material properties can define the unique identification mark of the structure. Beneficially, as the variation in material properties at the defined area is due solely to the variation in processing parameters during the formation of this area, one or more of the resulting characteristics of this area can be completely random in development. Thus, the unique identification mark can possess components that are unique and random and thus almost impossible to reproduce.

In general, the density of the formation and/or binding material can be one of the parameters of the area containing the identification mark that will be affected by the variation in process parameters. Thus, determination of the density in this area can be utilized to identify the structure.

FIG. 1 presents an image of an identification mark as described herein in the x, y plane of a structure formed according to an additive manufacturing process. As utilized herein, the x, y plane generally refers to the plane in which a formation material can deposited, e.g., the plane in which a powder layer is deposited. The x, z plane and y, z plane refers to planes that are perpendicular to the x, y plane, i.e., measured through the depth of the formed structure, and the z direction can be perpendicular to the individual layers of the structure.

The image illustrates a first area 2 that defines the identification mark and a surrounding area 4. The area 2 of the identification mark is not limited to any particular size, but in one embodiment can be small enough to ensure that the difference in the physical characteristics of the identification mark as compared to the physical characteristics of the rest of the structure will not detrimentally affect the overall bulk characteristics (e.g., strength) of the structure. For instance, the geometric area of the x, y plane that encompasses the identification mark of area 2 can be about 10 square centimeters (cm$^2$) or less, or about 1 cm$^2$ or less in some embodiments.

The surrounding area 4 is formed with the processing parameters set such that this area of the final structure includes the desired bulk characteristics of the product, e.g., with the processing parameters set to the optimal values for the desired product. The area 2 is formed with one or more processing parameters set to a different value. As such, the area 2 will have one or more characteristics, e.g., porosity, that differ in a recognizable way from the surrounding area.

In the example of FIG. 1, the structure was formed according to an electron beam method. During formation of the area 2, the beam focus was varied. As can be seen, this variation results in increased porosity in the area with the darker regions 6 of the area 2 containing little or none of the formation material and as such exhibiting a lower density in those areas 6 and leading to a lower overall density for the entire area 2. As this density variation in the area 2 was developed only through alteration of the processing parameters during formation, the pattern of the density variations (i.e., the pattern of the areas 2 and 6) will be random and unique.

The identification mark can be located either internally or on the surface of an additively manufactured structure. In either case, non-destructive examination (NDE) techniques such as x-ray or computed tomography (CT) can be utilized to examine the mark. For example, x-ray examination can provide a 2 dimensional image of an identification mark as illustrated in FIG. 1.

The portion of the structure that encompasses the identification mark can be examined as a two dimensional plane or alternatively as a slice of the overall structure. When a three dimensional slice is examined, the slice can be of any suitable depth in the z direction of the structure. For instance, the portion that is examined can be a relatively thin slice that has a depth in the z direction about 1000 μm or less, about 500 μm or less, or about 100 μm or less in some embodiments. This is not a requirement, however, and a thicker slice of a structure can be utilized to define the identification mark, examples of which are discussed further below. For example, FIG. 2 illustrates three views of a relatively thin slice that encompasses the area 2 and provides three views of the identification mark of FIG. 1 including a top view (i.e., in the x, y plane) 12, an end view 14, and a side view 16.

Figure 2:
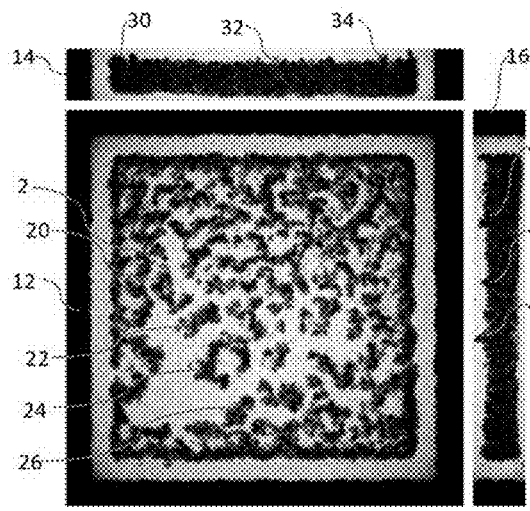
FIG. 2 presents three different views of the identifying mark of FIG. 1.

The density variation of the area 2 can be examined and reported either as an image, as shown in FIG. 1 or FIG. 2, or alternatively numerically, for instance as the average density of the predetermined portion of the structure that includes the identification mark. For example, to report the density of the area 2 as a numerical value, the volume of the areas 6 can be estimated to obtain the total amount of the formation material in the area 2 and this combined with the known density of the formation material can be utilized to obtain an average density for the area 2.

Alternatively, the image of the area 2 can be used as a visual identification mark. A beneficial feature of the identification mark is that the random features of the identification mark can be smaller than the resolution of the additive manufacturing machine that is used to form the structure. As such, it would not be possible to intentionally copy the features of the formation material that together form the identification mark. This can prevent duplication of the area 2 and formation of a counterfeit mark.

Referring again to FIG. 2, the top view 12 of the area 2 includes a plurality of individual features 20, 22, 24, 26, etc. that can be visualized in an examination of the area by use of a suitable visualization technique such as x-ray. The end view 14 likewise includes a series of recognizable features 30, 32, 34; as does the side view 16; i.e., 40, 42, 44. These features are formed during the manufacturing process during that time that the process parameter is varied from the norm. The features define a unique and random pattern of the formation material in the area 2. In addition, these features can be quite small, for instance on the order of about 10 μm or less, about 5 μm or less, or about 2 μm or less in some embodiments. The size of these features can be smaller than the resolution of the machine used to form the structure, as discussed. Thus, the identification mark of the area 2 can be essentially impossible to replicate due to the combination of the size and the random pattern of the features that form the mark.

The identification mark can be located at any location in or on the structure. In one embodiment, the identification mark can be formed on a surface of the structure, similar to the location of traditional serial numbers. In other embodiments, the identification mark can be formed on the interior of the surface, as a traditional surface mark can be prone to damage, either intentional or unintentional. Intentional damage could be intentional removal or alteration of the mark. Unintentional damage could be from wear and tear or corrosion of the surface of the structure.

It may be preferred in some embodiments to form the identification mark on the inside of the part where it can be protected from both intentional and unintentional damage. Any attempt to intentionally modify or remove the fingerprint would be able to be detected as the part would show signs of tampering. The particular location inside the structure can be determined on a design by design basis, with a preferred location depending on, e.g., the physical requirements of the structure and the ease of scanning the location.

Upon determination of the location of the identification mark, the location and process parameter variation can be included in the programming system that is used to form the structure. Accordingly, at the desired location/time during formation of the structure, the process parameter of choice can be varied as programmed, and the identification mark that includes a random and distinct pattern of the formation material in the designated area can be formed. This area will also exhibit a variation in the formation material density that will be unique to the area, as discussed Following formation of the structure, the area of the structure that includes the identification marked can be examined by use of a suitable visualization technique, e.g., x-ray, CT scan, etc. to form a master of the identification mark of that individual structure. The examination technique can be highly detailed or less so, as desired. For instance, as discussed above, the identification mark can be defined by use of a two-dimensional examination of the area or by use of a three dimensional examination of the area and the multiple views of the mark that can be obtained by the three dimensional examination.

Figure 3:
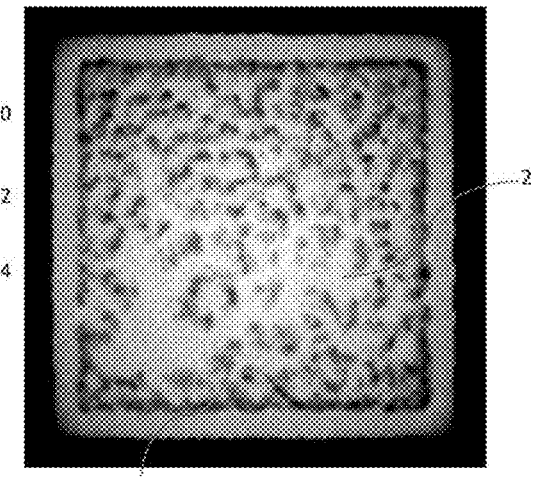
FIG. 3 presents an image of the identifying mark of FIG. 1 with the density of the local area shown as an average projection.

In addition, the examination technique can be carried out with a high level of detail or less so, as desired. For example, a minimum projection process can be utilized to obtain a highly detailed image as illustrated in FIG. 1 and FIG. 2. Alternatively, a maximum projection process or an average projection process can be utilized, which can image the identification mark with a different level of detail. For example, FIG. 3 is an image of the identification mark of the area 2 taken with an average projection x-ray device. As can be seen, the features of the mark (e.g., feature 26 as shown) are still clearly visible, but to a lesser degree of clarity. A less detailed version of the identification mark may be somewhat less secure, but can be less expensive to examine, and thus may be preferred in some embodiments.

In one embodiment, the examination technique can develop a voxol image of the identification mark. A voxol is a three dimensional pixel. According to this embodiment, a three dimensional examination of the area of the structure that contains the identification mark can be carried out. This three dimensional examination can then be converted to a series of voxols that can represent the identification mark. Each voxol of the area can represent a density measure as determined by the examination process. Accordingly, the voxol representation of the identification mark can be highly detailed or less so, as desired. For instance, the process can develop a voxol representation that includes only a single type of voxol at identified locations of the mark depending upon whether or not the density at that location of the mark exceeds a predetermined threshold. If the local region has a density that exceeds the predetermined threshold, the voxol is created. If not, no voxol is created. The resulting data set can describe the identification mark based upon the presence or absence of a voxol at each location in the mark.

More highly detailed voxol representations may alternatively be utilized. For instance, by use of a more detailed examination of the identification mark, a series of voxols can be used to describe the mark, each member of the series representing a predetermined density or density range. The resulting data set can describe the identification mark to a greater degree of accuracy as compared to the more simplified data set in which each location of the mark is either represented by a voxol or a null.

Figure 4:
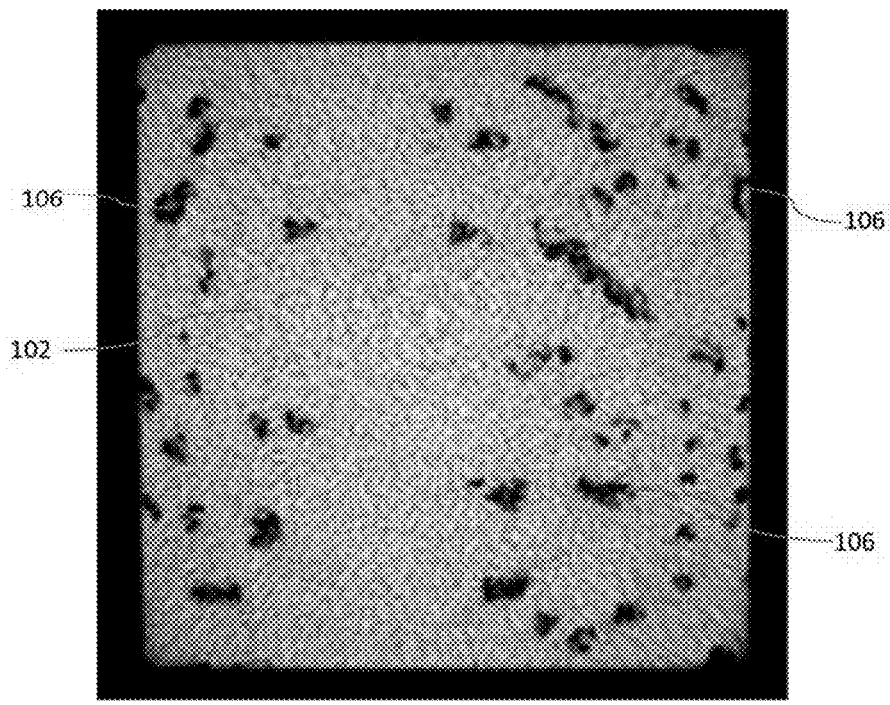
FIG. 4 is an image of an identifying mark formed as disclosed herein.
Figure 5:
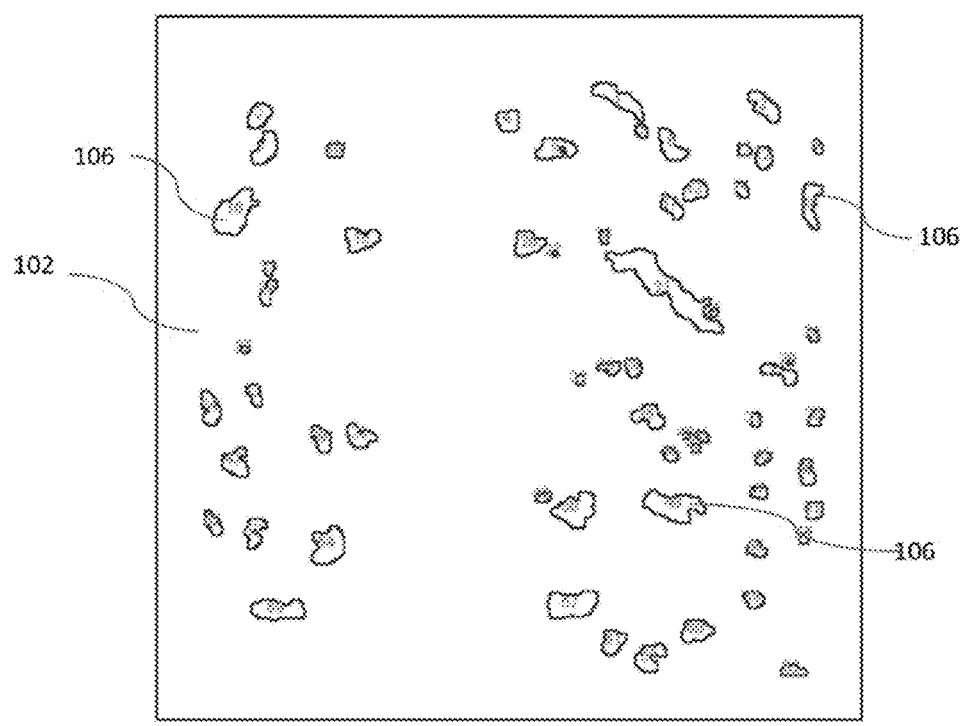
FIG. 5 illustrates the image of FIG. 4 following conversion of the image to a series of voxols.

FIG. 4 presents a planar image of an identification mark 102. As can be seen the mark 102 includes areas 106 of a lower density. The lower density areas can include the formation material in a non-solidified state and/or a void in the structure. Examination of the image e.g., by suitable scanning and identification software, can identify the low density areas as illustrated in FIG. 5. This information can then be used to develop a data set, e.g., a voxol data set that can be utilized to positively identify the structure.

Figure 6:
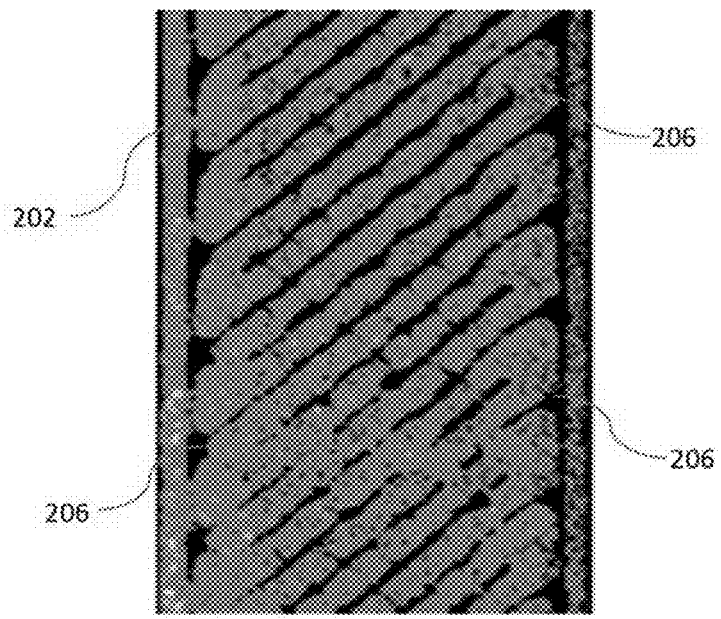
FIG. 6 is an image of an identifying mark formed as disclosed herein in the x, y plane of an area of an additive manufactured structure.
Figure 7:
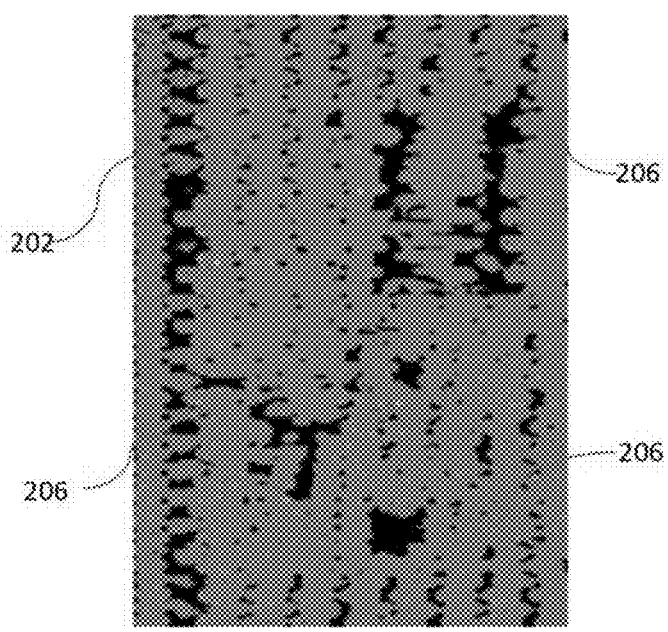
FIG. 7 is an image of the identifying mark of FIG. 5 in the xz plane of the area of the additive manufactured structure.

The identification mark can be a two dimensional mark or a three dimensional mark. One example of a three dimensional mark is illustrated in FIG. 6 and FIG. 7. FIG. is a top view (i.e., in the x, y plane) of an identification mark 202. This particular mark was formed in a polymeric structure formed according to a fused deposition modeling process as described previously. This identification mark 202, similar to those illustrated previously in metal structures, includes features 206 such that the formation material has a distinct and random pattern across the identification mark 202. In this embodiment, the pattern has been developed through variation of the extrusion rate of the polymer during the deposition process.

Optionally, the identification mark can be a three dimensional mark that extends to a relatively large distance in the z direction of the structure. FIG. 7 illustrates an x, z plane view of the identification mark 202 of FIG. 6. As can be seen, in this view the identification mark 202 also describes a plurality of features 206 that can be smaller than the resolution capability of the additive manufacturing device used to form the structure. Thus, the formation material can describe a random and unique pattern within the identification mark that can be essentially impossible to duplicate accurately.

As stated previously, a master identification mark can be formed at the time of formation of the structure. This master identification mark can then be compared to a later examination of the identification mark to determine the authenticity of the structure. For example, a scan of the predetermined area of a structure can be carried out according to the examination method of choice. The scan can then be codified or utilized visually and compared to the master scan of the structure. If the two identification marks are the same, then the structure can be positively identified.

If, upon comparison of the identification mark of the piece and the reference identification mark (i.e., the master), the two marks are not the same, then the structure can be flagged as of questionable origin. In one embodiment, a non-matching identification mark can then be compared to a full set of master identification mark files in an attempt to positively identify the structure. If a match is made between the identification mark and one of the master set, this could signify merely a mix-up in structure tracking, as the structure was formed by the original manufacturer. If no match is made between the identification mark of the structure and the master set of identification marks, the structure may be flagged as a counterfeit piece.

To further identify a structure, a traditional identification mark such as a serial number can be included on the exterior surface of the structure. This can provide an initial and easy-to-read code, as it would not require specialized equipment, and could be considered a reference number rather than an official identification mark. A traditional and surface located code could also be used to speed up the process of identifying the structure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for forming an identification mark in a structure comprising:
   depositing a formation material;
   cohering the formation material to solidify at least a portion of the formation material and form a structure portion;
   altering one or more process parameters during the depositing and/or the cohering such that a first area of the structure portion has a first density and a second area of the structure portion has a second density, the first area including the identification mark, the identification mark including the formation material in a random and distinct pattern that is formed as a result of the alteration of the one or more process parameters, wherein the identification mark is three dimensional.

2. The method of claim 1, wherein the formation material is deposited as a powder or is a component of a liquid bath.

3. The method of claim 1, wherein the formation material is deposited as an extrudate.

4. The method of claim 1, further comprising depositing a binder on the formation material following deposition of the formation material.

5. The method of claim 4, wherein the one or more process parameters comprise the rate of deposition of the binder or the temperature of the binder.

6. The method of claim 1, wherein the step of cohering the formation material comprises focusing energy on the formation material.

7. The method of claim 6, wherein the energy is in the form of a laser or an electron beam.

8. The method of claim 6, wherein the one or more process parameters comprise the power of the focused energy.

9. The method of claim 1, wherein the one or more process parameters comprise the rate of deposition of the formation material, the rate of cohesion of the formation material, or the temperature of the formation material.

10. An additively manufactured structure comprising a first area and a second area, the first and second areas comprising a formation material, the first area encompassing a three dimensional identification mark, the first area defining a first density and the second area defining a second, different density, the identification mark including the formation material in a distinct and random pattern.

11. The additively manufactured structure of claim 10, wherein the formation material comprises a polymer, a metal, a metal alloy, a clay, a ceramic, or a combination thereof.

12. The additively manufactured structure of claim 10, wherein the first area comprises an internal area of the structure.

13. The additively manufactured structure of claim 10, wherein the first area has a cross sectional dimension of about 10 square centimeters or less.

14. The additively manufactured structure of claim 10, wherein the random and distinct pattern comprises multiple features each having a dimension of about 10 micrometers or less.

15. The additively manufactured structure of claim 10, wherein the first area is porous.

16. A method for identifying a structure comprising:
examining a predetermined area of the structure, the area comprising a formation material in a random and distinct pattern;
developing a data set of voxols of the predetermined area, wherein each voxol represents a density of the formation material in a region of the predetermined area;
comparing the distinct and random pattern to a reference pattern; and
determining that the distinct and random pattern is either the same as or different as the reference pattern.

17. The method of claim 16, the step of examining the predetermined area comprising creating an image of the area.

18. The method of claim 17, wherein the image is an x-ray image or a computerized tomography image.

19. The method of claim 16, wherein the predetermined area is a two dimensional area or a three dimensional area.

20. The method of claim 16, wherein the step of examining the predetermined area comprises creating multiple images of the area, each image being in a different plane of the structure.

21. The method of claim 16, wherein the method is a counterfeit recognition method or a product tracking method.

* * * * *